W. RUNDQUIST.
LAWN SPRINKLER.
APPLICATION FILED JAN. 29, 1913.
1,100,493.
Patented June 16, 1914.
2 SHEETS—SHEET 1.
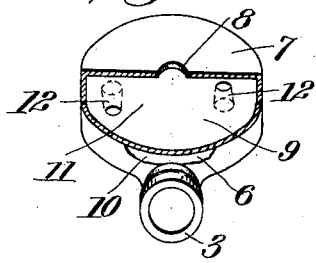
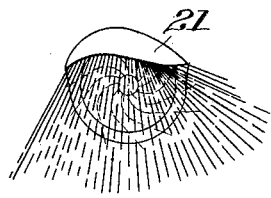
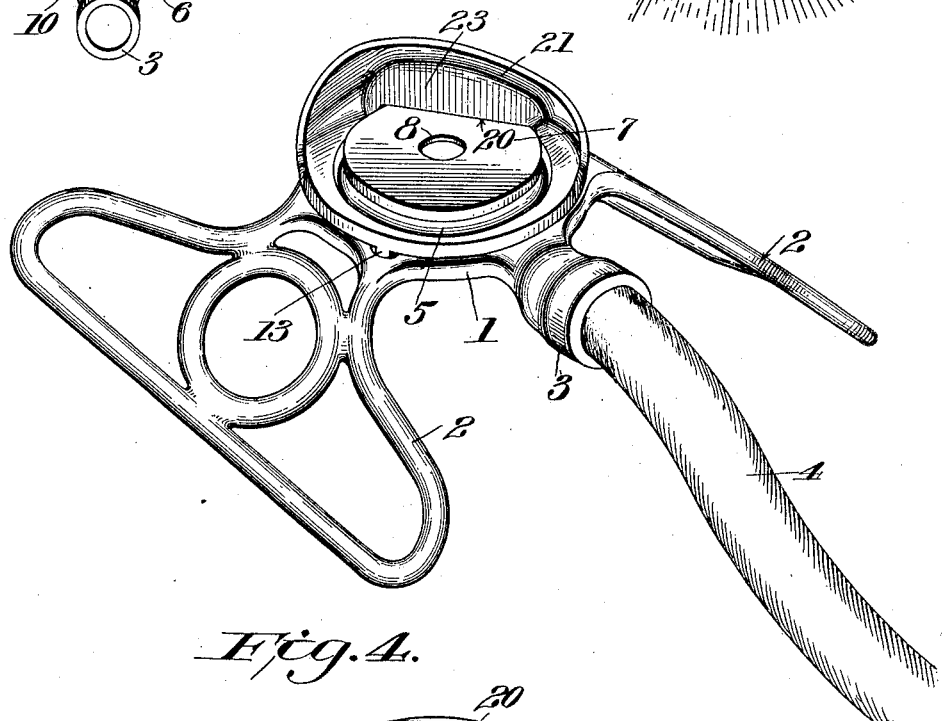
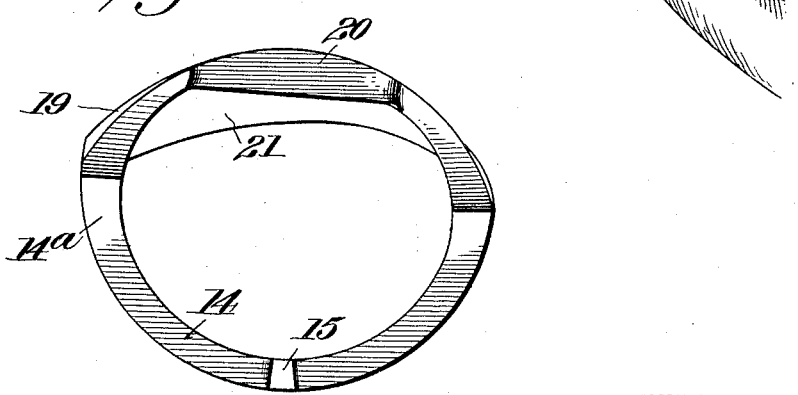
WITNESSES
INVENTOR
William Rundquist
By Edson Bros., Attorneys W. RUNDQUIST.
LAWN SPRINKLER.
APPLICATION FILED JAN. 29, 1913.
1,100,493.
Patented June 16, 1914.
2 SHEETS—SHEET 2.
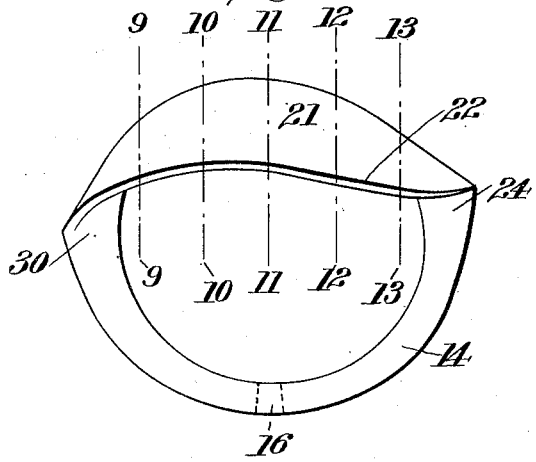
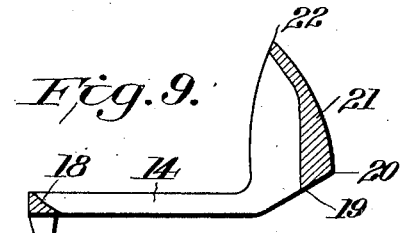
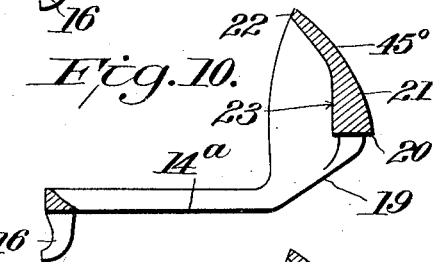
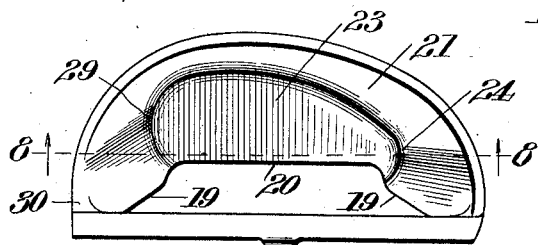
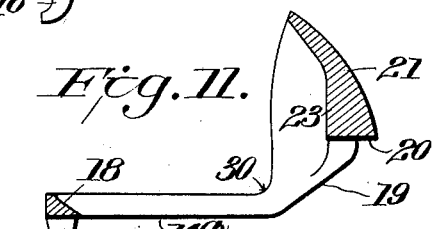
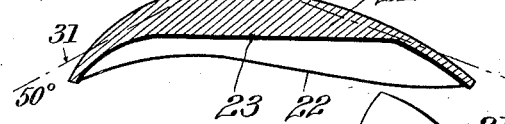
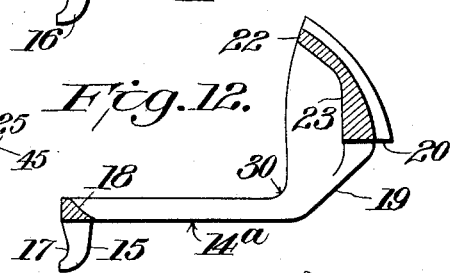
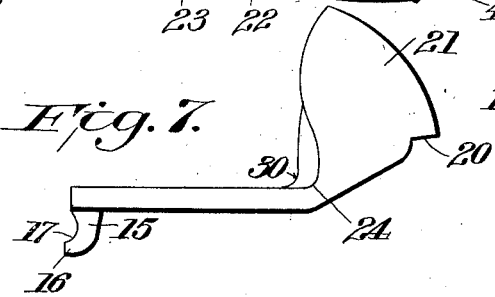
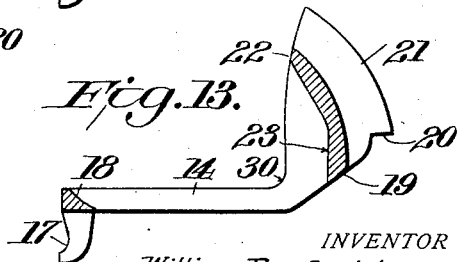
WITNESSES
C. N. Walker.
G. W. Michael, Jr.
INVENTOR
William Rundquist
By Edson Bro's Attorneys
COLUMBIA PLANOGRAPH CO., WASHINGTON, D. C.

UNITED STATES PATENT OFFICE.

WILLIAM RUNDQUIST, OF ELGIN, ILLINOIS, ASSIGNOR OF ONE-HALF TO HENRY G. WEATHERILL, OF ELGIN, ILLINOIS.

LAWN-SPRINKLER.

1,100,493.　　　　　　　　Specification of Letters Patent.　　Patented June 16, 1914.

Application filed January 29, 1913. Serial No. 744,965.

*To all whom it may concern:*

Be it known that I, WILLIAM RUNDQUIST, a citizen of the United States, residing at Elgin, in the county of Kane and State of Illinois, have invented certain new and useful Improvements in Lawn-Sprinklers; and I do hereby declare the following to be a full, clear, and exact description of the invention, such as will enable others skilled in the art to which it appertains to make and use the same.

This invention is a lawn sprinkler wherein water is distributed over the greatest possible area.

The invention contemplates, also, the adjustment of the sprinkler to direct a stream or spray of water to one side of the device, whereby the sprinkler may be positioned to direct the full flow of water in a general direction, and prevent the water from flowing in a particular direction, for example, on a sidewalk or against a building, and the like.

The invention embodies a sprinkler of the type having a substantially central orifice for the exit of water under pressure, together with a removable and adjustable deflector positioned in coöperative relation to the orifice, said deflector being so constructed that it will remain in its operative position irrespective of the pressure or force of the water issuing from the orifice, whereby the water may be distributed from the sprinkler in a predetermined direction, leaving a portion of the surface adjacent the sprinkler free from contact with water.

In employing a deflector with a sprinkler having a single orifice or port, especially of the whirling or the "double whirl" type, it has been found that the action of the water frequently lifts the deflector from its seat and out of position when a heavy pressure of water is employed, and thereby defeats the purposes of the deflector. With this invention, however, the deflector is constructed with a substantially concavo-convex member, the inner face of which is substantially flat for a portion thereof, and the remainder of the surface is so curved as to guide and direct the water in the desired manner. The particular formation of the inner surface of the concavo-convex member, combined with the means for positioning and anchoring the deflector, overcome the objections to the deflecting means which have been heretofore employed in connection with sprinklers having a single orifice and producing a whirling jet of water, by so directing the water as to relieve the deflector of the strain or resistance to which it is subjected by the force of water.

The invention consists, also, in the advantages, the features of construction, and the combination of parts as will be more fully hereinafter described and pointed out in the appended claims.

One embodiment of the invention is illustrated in the accompanying drawings but the construction shown herein is to be understood as merely illustrative, and not as defining the limits of the invention.

Figure 1 is a perspective view of the sprinkler and deflector in operative position. Fig. 2 is a view of a portion of a sprinkler, parts being broken away, upon which the deflector is particularly adapted for use. Fig. 3 is a diagrammatic view, in plan, showing the position of the deflector on the sprinkler and the path of water. Fig. 4 is a bottom plan view of the deflector. Fig. 5 is a top plan view of the deflector. Fig. 6 is a front elevation of the deflector. Fig. 7 is a side elevation thereof. Fig. 8 is a horizontal sectional view on the line 8—8 of Fig. 6, looking in the direction of the arrow. Fig. 9 is a vertical sectional view through the deflector on the line 9—9 of Fig. 5. Fig. 10 is a vertical sectional view on the line 10—10 of Fig. 5. Fig. 11 is a sectional view on the line 11—11 of Fig. 5. Fig. 12 is a sectional view on the line 12—12 of Fig. 5, and Fig. 13 is a sectional view on the line 13—13 of Fig. 5.

The sprinkler may be made of any suitable material, and is shown provided with a base 1 having suitable supports 2 and a screw threaded coupling 3 to which may be attached a hose 4, or any other suitable conductor for the water. Within the base is formed a sprinkler head 5 comprising a lower wall indicated at 6, a cap 7 having a substantially central orifice 8 therein, said cap having any suitable means for retaining it in position (not shown). Within the head is positioned a diaphragm 9 which produces a lower chamber 10 and an upper chamber 11. The coupling member 3 opens directly into the chamber 10. Suitably inclined ports 12 are provided in the diaphragm 9 to conduct the water from chamber 10 to chamber 11, and to project water into chamber 11 in a forcible jet or stream and thereby produce a whirling effect of the water within said chamber 11 so that the water may be thrown out through orifice 8 by centrifugal force. These ports 12 are preferably oppositely positioned on the diaphragm with their exit mouths positioned in opposite directions so that the water may be carried in the same direction around the circular sprinkler head in chamber 11. These ports 12 are positioned out of alinement with the orifice 8, and preferably at a point intermediate the center of the diaphragm 9 and its periphery. The sprinkler shown is of a type which I have termed the "double whirl."

The base 1 is preferably provided with a plurality of apertures 13, the purpose of which will be hereinafter referred to.

An essential feature of the invention is a deflector which is designed to be used in connection with the sprinkler of the type disclosed, or any type of sprinkler employing a whirling jet of water from a single orifice. The deflector is disclosed in the drawings as comprising a substantially semi-circular ring-like base member 14, which member 14 is adapted to rest upon the base 1 of the sprinkler disclosed in the drawings. This base is provided with a suitable depending leg 15, the lower end of which is shown curved, as at 16, to produce a foot serving as retaining means for engaging the under surface of the base 1 when the remainder of the deflector is moved to its operative position upon the sprinkler. This shape of the leg 15 requires that the deflector be rotated on the curved portion 17 thereof prior to permitting its removal from the sprinkler. The inner surface of the ring-like member 14 is preferably inclined, as at 18, to facilitate the casting of the deflector in a one-piece structure, although it is obvious that the shape of the ring may be of any other type preferred. The deflector is provided with an inclined rear portion 19 extending from the ring-like member 14 to the base 20 of a directing element 21. This base 20 is substantially parallel with the base of the ring 14, but on a plane above said ring. Said base 20 is shown in Fig. 11 as of thickened material serving as a weighted portion for the directing element and this base is adapted to rest upon the upper face of the cap 7, as shown in Fig. 1, the position of the base and the depending leg 15, together with the ring-like member 14 surrounding the head of the sprinkler, as shown in Fig. 1, coöperate to retain the deflector in position on the sprinkler. This base member 20 I have termed a minor base portion, in contradistinction to the major base portion 14$^a$ of the deflector. The deflector is of greatest length parallel with its directing element 21, and this I have termed the longitudinal axis of the deflector, as will be understood from an inspection of Figs. 4 and 5.

The directing element 21 is shown as provided with an outer convex wall, the axis of which is on a line substantially forty to fifty degrees to the base line 14$^a$ of the deflector, although any form of the outer wall may be employed. This directing element is so positioned that its outer free edge 22 describes a substantially compound curve across the longitudinal axis of the deflector, as will be understood from an inspection of Fig. 5. The inner face of the directing element 21 is shown as of peculiar formation, having a straight substantially vertical wall 23 extending upwardly from the minor base 20. The outer edges of this wall describes a figure substantially ovoid or egg-shape, as will be more readily understood from an inspection of Fig. 6, and from an inspection of the model. From one end 24 of this ovoid figure, the inner face of the directing element is curved toward the end 24 of the ring 14, the axis of said curve being shown by the line 25 of Fig. 8. From the opposite end 29 of the ovoid figure, said inner surface is slightly curved toward the end 30 of the ring-like member 14, the axis of said latter curve being indicated by the dotted line 31 of Fig. 8. From said Fig. 8, it will be understood that the curves just described, forming the lines 25—31, are of different degrees, for the purpose of directing the flow of water from the sprinkler in the proper manner to be discharged from the deflector. The remainder of the inner wall of said directing element is curved from the point 29 to the point 24, and also from the edge of the ovoid member 23 to the edge 22. In Figs. 9, 10 and 11, the axis of this curve is at an angle of substantially fifty-five degrees to the base line 14$^a$, whereas in Fig. 12 the curvature is changed so that the angle may be stated at from forty-three to forty-five degrees, while in Fig. 13, this angle is changed to substantially fifty degrees. The curvature and general formation of the inner face of this concavo-convex member, together with the substantially straight wall thereof, has been found to produce novel results, in connection with a sprinkler of the double whirling type. The place at which the compound curved edge 22 joins the ring-like base 14 at 24 is at a point farther from the longitudinal axis of the deflector than is the point at which said curve 22 joins the ring-like member 14 at 30, as will be understood from an inspection of Figs. 5 and 7.

In operation, the sprinkler is connected to a source of supply, such as the hose 4, water being directed into the lower chamber 10 under pressure from which the water will be projected in chamber 11 through the inclined ports 12 and out in a whirling spray, such as is shown by the fine lines in a diagrammatical view of Fig. 3, the spray of water assuming a substantially dish-like effect when a heavy pressure of water is employed. The deflector may be secured to the base in a number of positions, the leg 15 being inserted into one of the apertures 13 with the ring-like member surrounding the head 7 and the minor base 20 resting upon a portion of the upper face of the head. When in this position, the whirling stream of water on the side adjacent the deflector will engage the concave and straight face of the deflector and be directed away from said element 21 in various directions, as indicated by the heavy lines in the diagrammatic view of Fig. 3, thus protecting anything which may be in the rear of the deflector 21 from contact with the water.

Having thus explained the nature of my invention and described an operative manner of constructing and using the same, although without attempting to set forth all of the forms in which it may be made, or all of the forms of its use, what I claim is:—

1. A sprinkler comprising a frame, a head having a substantially central orifice, means within the head to project a stream of water through the orifice, and a deflector removably mounted upon the sprinkler head, said deflector having a circumferential ring-like base member adapted to rest upon the sprinkler frame and engage the head, and a concavo-convex directing element integral with said base member and adapted to rest upon said sprinkler head, said directing element having a thickened lower portion to form a weighted base, the axis of the directing element being approximately 45° to the plane of the base member of the deflector.

2. A sprinkler comprising a frame, a circular head having an orifice centrally of a flat upper face, and an inner diaphragm providing upper and lower chambers, a plurality of ports in the diaphragm out of alinement with said orifice and operating to direct a whirling stream of water through the orifice, and a deflector mounted on the frame, said deflector comprising a circular base adapted to surround the head, and a weighted directing element adapted to rest on the head, said directing element having a concave inner face with a substantially flat central portion, the flat and curved portions of the concave face operating to deflect the whirling stream of water in a predetermined direction.

3. A sprinkler comprising a frame, a circular head having an orifice centrally of its upper flat face, and an inner diaphragm providing upper and lower chambers, oppositely positioned ports in the diaphragm out of vertical alinement with said orifice and operating to direct a whirling stream of water through the orifice, and a deflector adapted to be mounted at various positions on the frame, said deflector comprising a circular base adapted to surround the head, means depending from the base to engage the sprinkler frame, and a weighted directing element adapted to rest on the flat face of the head, said directing element having a concave inner face with a substantially flat central portion, the flat and curved portions of the concave face operating to deflect the whirling stream of water in a predetermined direction.

4. A sprinkler comprising a substantially circular head, means to project a whirling stream of water from about the central upper surface thereof, and a deflector adapted to be mounted at various positions on the head, said deflector comprising a circular base adapted to surround the head and a directing element adapted to engage a part of the whirling stream and change its path of movement, said directing element having a lower thickened portion adapted to rest on the head, the inner face of said element having a flat surface substantially ovoid in shape, and a curved surface extending from the flat surface at various angles to an upper curved edge.

5. A sprinkler comprising a substantially circular head having an upper face plate, means to project a whirling stream of water from about the central portion of said face plate, and a deflector adapted to be mounted at various positions on the head, said deflector comprising a substantially circular base adapted to surround the head, and a directing element adapted to engage a part of the whirling stream and change its path of movement, said directing element having a lower thickened portion adapted to rest upon the face plate, the inner face of said element being partly curved and partly flat, the flat surface being substantially oval in shape, said inner face being curved at the ends of the flat surface toward the circular base.

6. In a deflector for sprinklers, a substantially circular base and a directing element integral therewith, said element having a lower thickened portion and a thin upper edge, the inner face thereof having a flat surface substantially oval shaped, said inner face being curved from said flat surface toward the upper edge, and also curved toward the circular base, from the ends of said flat surface, the axis of one of the end curves being at a greater angle to the longitudinal axis of the deflector than that of the other of said end curves.

7. In a deflector for sprinklers, a substantially ring-like frame adapted to surround a sprinkler head, and a directing element integral therewith, said element having a lower portion of varying thickness terminating in a thickened base on a plane above the ring-like frame, the inner face of said directing element having a flat surface extending from said thickened base, and a curved surface connecting the outer edge with the flat surface, said outer edge, when viewed in plan, presenting the appearance of a compound curve adapted to extend transversely across the face of a sprinkler head.

8. A deflector for sprinklers comprising a substantially ring-like frame having an outer thickened edge and a thinner inner edge, a lug depending from said ring-like frame, and a directing element vertically positioned on the base, said directing element having a lower thickened portion to form a weighted base and a thin upper portion, the inner face of the directing element being concave for a part thereof and provided also with a flat surface substantially oval shaped and extending to the weighted base.

In testimony whereof, I affix my signature, in the presence of two witnesses.

WILLIAM RUNDQUIST.

Witnesses:
EUGENE P. FERRON,
WM. F. GROMER.

Copies of this patent may be obtained for five cents each, by addressing the "Commissioner of Patents, Washington, D. C."